United States Patent [19]

Sizer, II et al.

[11] Patent Number: 5,430,819
[45] Date of Patent: Jul. 4, 1995

[54] MULTIPLE OPTICAL FIBER CONNECTOR AND METHOD OF MAKING SAME

[75] Inventors: Theodore Sizer, II, Little Silver; James A. Walker, Howell, both of N.J.

[73] Assignee: AT&T Corp., Murray Hill, N.J.

[21] Appl. No.: 171,283

[22] Filed: Dec. 21, 1993

[51] Int. Cl.⁶ .................. G02B 6/38; G02B 6/36
[52] U.S. Cl. .................................. 385/59; 385/55; 385/53; 385/71; 385/64; 385/77; 385/82; 385/85; 385/136; 385/137; 385/51; 385/52
[58] Field of Search ............ 385/44, 49, 51, 52, 385/64, 71, 83, 85, 59, 139, 53, 55, 56, 64, 77, 82, 136, 137

[56] References Cited

U.S. PATENT DOCUMENTS

| | | | |
|---|---|---|---|
| 4,818,058 | 4/1989 | Bonanni | 385/59 |
| 4,865,413 | 9/1989 | Hübner et al. | 385/99 X |
| 5,185,846 | 2/1993 | Basavanhally et al. | 385/52 X |
| 5,199,093 | 3/1993 | Longhurst | 385/49 X |
| 5,214,730 | 5/1993 | Nagasawa et al. | 385/59 |
| 5,276,754 | 1/1994 | Blair et al. | 385/88 |
| 5,339,376 | 8/1994 | Kakii et al. | 385/59 X |

FOREIGN PATENT DOCUMENTS

| | | | |
|---|---|---|---|
| 55-45051 | 3/1980 | Japan | 385/59 X |
| 56-30112 | 3/1981 | Japan | 385/59 X |
| 2-120812 | 5/1990 | Japan | 385/59 X |

*Primary Examiner*—Brian Healy
*Attorney, Agent, or Firm*—John A. Caccuro

[57] ABSTRACT

A multiple optical fiber connector is constructed from a unitary planar substrate having two surfaces with 1) multiple fiber holes and 2) plural alignment regions located in opposing relationship to each other along edges of the substrate, the multiple fiber holes and plural alignment regions being formed substantially perpendicular to and between the surfaces of the substrate using photolithographical techniques. Each optical fiber is permanently mounted through one of the holes in one surface of the substrate so that the end of each fiber is substantially flush with the other surface of the substrate. Alignment posts which are positioned against the alignment regions and mounted substantially perpendicular to the surfaces of the substrate are used to align optical fibers mounted in the substrate with optical fibers mounted in a substrate of a mating connector.

18 Claims, 4 Drawing Sheets

5,430,819

MULTIPLE OPTICAL FIBER CONNECTOR AND METHOD OF MAKING SAME

TECHNICAL FIELD

The present invention relates to multiple optical fiber connectors and their method of construction.

BACKGROUND OF THE INVENTION

The increased use of optical communication systems has increased the need for optical fiber cables to provide interconnections thereto. When optical fiber cables include multiple fibers, the cable connector costs may be expensive because of the requirement for precise alignment of each of the optical fibers. One such multiple optical fiber cable connector, shown in FIG. 1, is the MACII connector manufactured by AT&T. While this optical fiber connector performs well, there is a continuing need to decrease the cost of such a connector without affecting its performance.

SUMMARY OF THE INVENTION

The present invention comprises a multiple optical fiber connector constructed from a unitary planar substrate having two surfaces with 1) multiple fiber holes and 2) plural alignment regions located in opposing relationship to each other along edges of the substrate, the multiple fiber holes and plural alignment regions being formed substantially perpendicular to and between the surfaces of the substrate using photolithographical techniques. The multiple optical fiber connector has each fiber permanently mounted through one of the holes in one surface of the substrate so that the end of each fiber is substantially flush with the other surface of the substrate.

According to one aspect of the invention, alignment posts positioned against the alignment regions and mounted substantially perpendicular to the surfaces of the substrate are used to align optical fibers mounted in the substrate with optical fibers mounted in a substrate of a mating connector.

DETAILED DESCRIPTION

In the following description, each component of each figure has a reference designation associated therewith. If the same component is used in multiple figures, the same reference designation is used.

The drawings of the various figures are not necessarily to scale and contain dimensional relationships which are exaggerated to aid in the clarity of the description of the invention.

Figure 1:
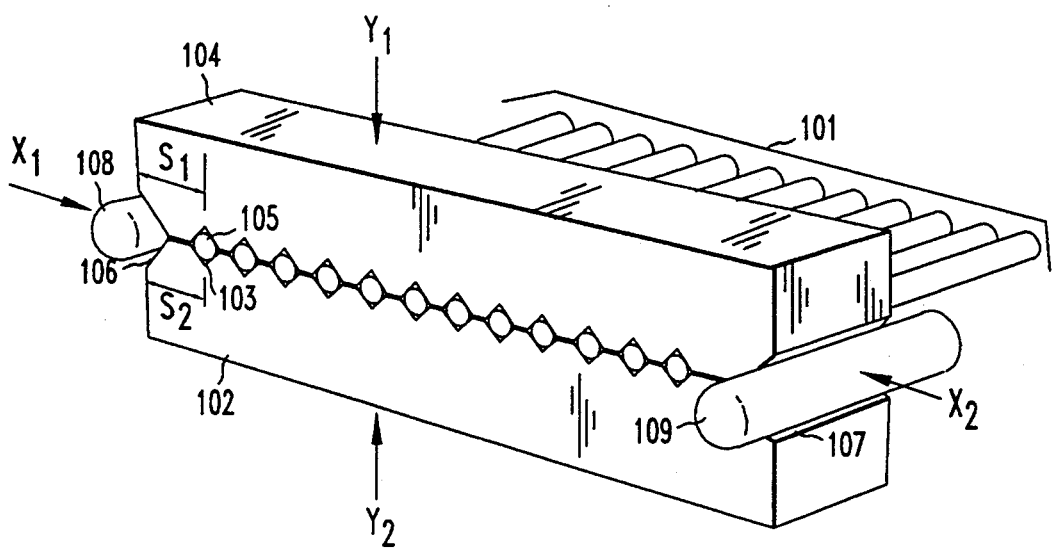
FIG. 1 is a perspective drawing of the optical fiber alignment arrangement of a prior art MACII multiple optical fiber cable connector.

Shown in FIG. 1 is a perspective drawing of the previously referenced optical fiber alignment arrangement of the MACII optical fiber cable connector. Silicon chips 102 and 104 are formed from a silicon wafer in which the shallow grooves (e.g., 103) for the fiber and the deep alignment grooves (e.g., 106) are precision etched. After etching, the wafer is cut at the center of the deep grooves, forming individual silicon chips 102 and 104.

Assembly of the MACII connector is as follows: Optical fiber cable 101 is mechanically stripped to expose the glass fibers. With the aid of a simple centering apparatus (not shown), the fibers are inserted into the grooves, e.g., 103, of silicon chip 102. A mating silicon chip 104 having a plurality of grooves, e.g., 105, is placed on top of silicon chip 102. The silicon chips 102 and 104 also have V-shaped alignment grooves at each end, illustratively shown as 106 and 107, respectively. A spring clip (not shown) aligns and holds chips 102 and 104 together in the vertical direction (see Y1 and Y2). Horizontal alignment between the silicon chips 102 and 104 is accomplished using a pair of alignment pins 108 and 109 which apply forces to the end grooves of these chips. A spring clip (not shown) exerts forces on alignment pins 108 and 109 in the horizontal direction (see X1 and X2) to maintain horizontal alignment of chips 102 and 104. A contact epoxy is then used to permanently lock the entire assembly in place. A polishing fixture is then used to polish the array of fibers of cable 101 flat against the front surface of chips 102 and 104.

Figure 2:
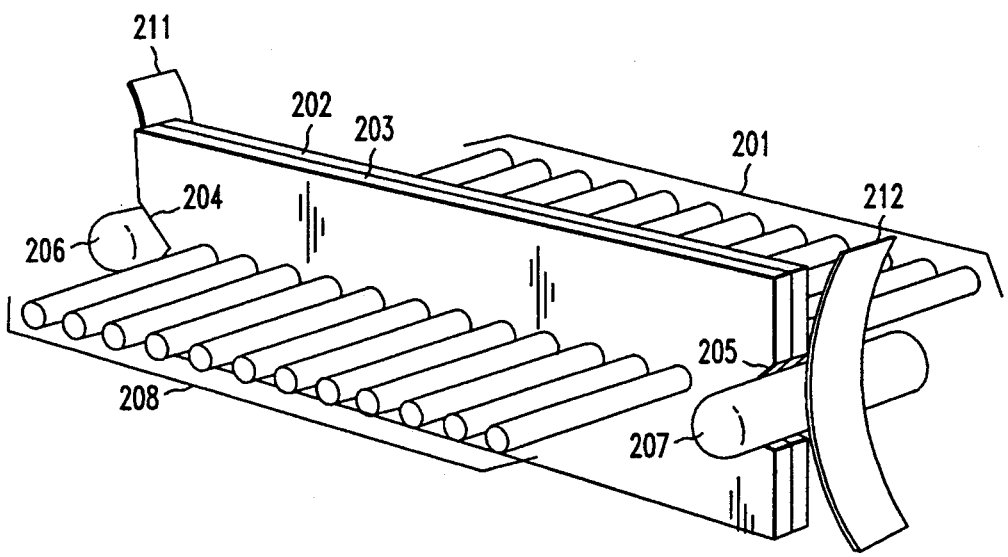
FIG. 2 is a perspective drawing of the optical fiber alignment arrangement used in a multiple optical fiber connector of the present invention.
Figure 3:
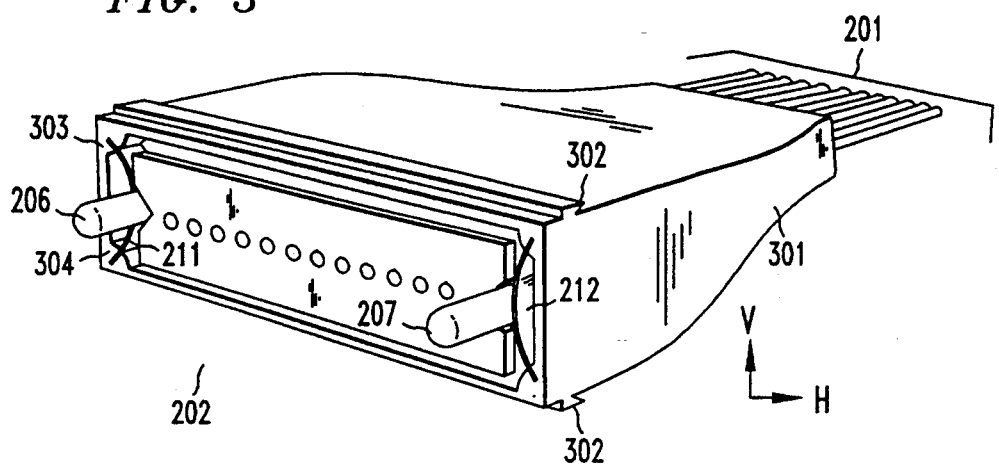
FIG. 3 is a perspective drawing of an illustrative optical fiber connector housing of the present invention.

Shown in FIG. 2 is a perspective drawing of the optical fiber alignment arrangement for two mating connectors in accordance with the present invention. The components of the male connector include multiple optical fibers (illustratively, as part of an optical fiber ribbon cable 201), substrate 202, alignment pins 206 and 207, and leaf springs 211 and 212. Substrate 202, alignment pins 206 and 207, and leaf springs 211 and 212 are mounted in the male connector housing as shown in FIG. 3. The components of the female connector include optical fiber cable 208, substrate 203 and openings to accommodate alignment pins 206 and 207. Substrate 203 is flexibly mounted in the female connector housing (not shown). The substrates 202 and 203 include a plurality of optical fiber sized holes which are etched through the substrates. The substrates 202 and 203 each include V-shaped notches 204 and 205 which have been etched at respective ends of the substrates. When the male connector is inserted into the female connector, horizontal forces on alignment pins 206 and 207 (provided by leaf springs 211 and 212) cause substrate 202 to flexibly align with substrate 203 in both the vertical and the horizontal direction, ensuring alignment of corresponding optical fibers of cables 201 and 208.

Shown in FIG. 3 is a perspective drawing of an illustrative male optical fiber connector housing 301. The housing 301 is molded of a hard plastic which includes shoulder regions, e.g., 303 and 304, into which the leaf springs, e.g., 211, are mounted. A soft plastic (similar to 406 of FIG. 4) is molded around optical fibers 201 and substrate 202 to flexibly mount them within housing 301. Alignment pins 206 and 207 are inserted and held in position in connector 301 by the horizontal force applied by the leaf springs 211 and 212. Alternatively, the substrate 202 and optical fibers 201 can be molded as part of the hard plastic housing 301 (as shown by 310 in FIG. 4). An illustrative latching mechanism or component 302 formed along two edges of the male connector enables the male connector to be latched to a matching latching mechanism on the female connector.

Figure 4:
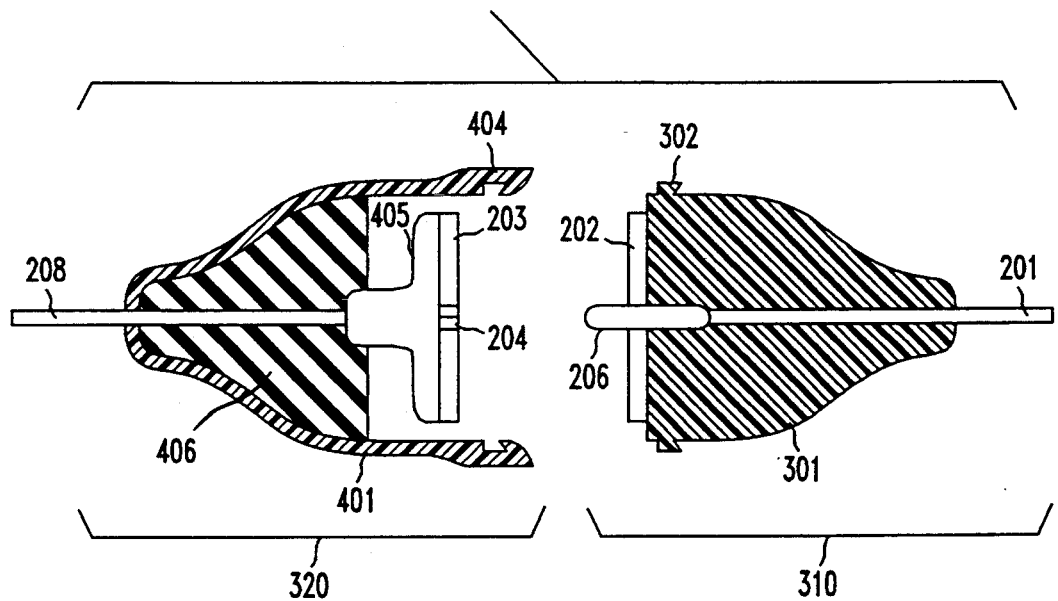
FIG. 4 shows a side view of two mating optical fiber connectors of FIG. 3.

Shown in FIG. 4 is a cutaway side view of illustrative male and female optical fiber connectors. The male connector 310 shows substrate 202 and optical fibers 201 molded as part of the hard plastic housing 301. The mating female connector 320 includes a hard plastic housing 401 which mounts to optical cable 208. Housing 401 includes a mating hook-shaped latching component 404 which snaps together with or latches to latching component 302 of housing 301. The substrate 203 is first rigidly molded, 405, to cable 208. Thereafter, the molded piece 405 is encapsulated in a soft plastic 406 within housing 401. The soft plastic 406 is pliable and enables the substrate 203 to move in the vertical and horizontal directions shown in FIG. 3. Well known plastic and injection processes may be used to form the housings of connectors 310 and 320.

As previously noted, the male connector 310 could be constructed like female connector 320 so that substrate 202 and optical fibers 201 are rigidly molded together (e.g., the molded piece 405) and then encapsulated in a soft plastic (e.g., similar to 406) within housing 301.

When the male connector 310 is mated with the female connector 320, the rigidly mounted alignment pin 206 comes in contact with V-groove 204 of substrate 203, forcing alignment of substrate 203 with substrate 202.

Figure 5:
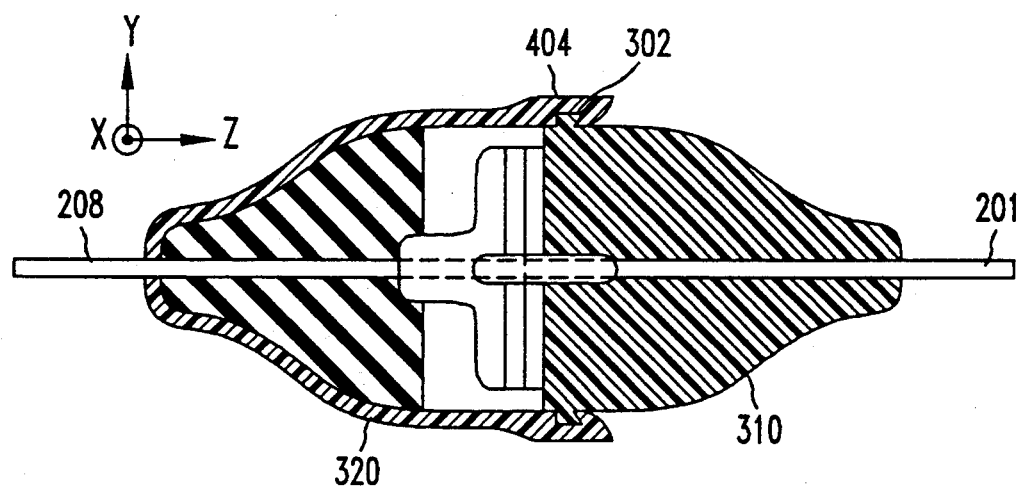
FIG. 5 shows the engagement of the mating optical connectors of FIG. 4.

Shown in FIG. 5 is the engagement of the male connector 310 with female connector 320. Alignment pin 206 is shown aligning substrate 202 with substrate 203 in the X and Y directions. The hook-shaped latching component 404 is shown engaged with latching component 302, thereby keeping substrate 202 and 203 positioned against each other in the Z direction.

Figure 6:
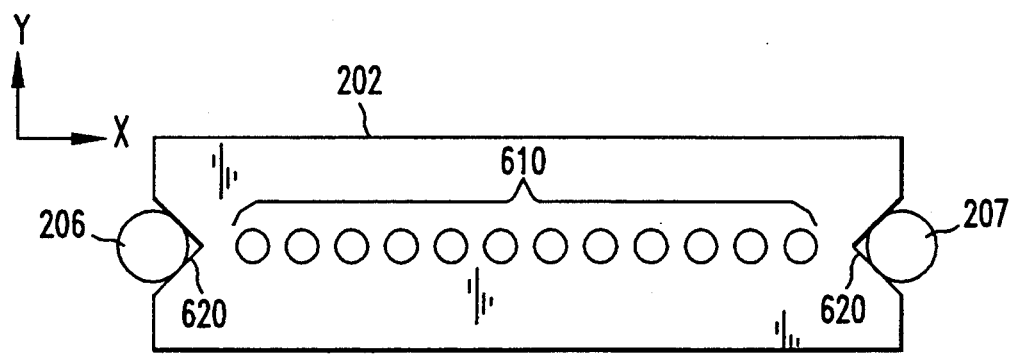
FIG. 6 shows an illustrative optical fiber alignment arrangement of our connector having a notched substrate and guide pin arrangement.

Shown in FIG. 6 is a front view of an illustrative rectangularly shaped substrate used in FIG. 3 having multiple holes 610 and V-shaped notches 620 at each end and including circular alignment pins 206, 207. According to the invention, the substrate 202 has the multiple holes 610 and the V-shaped notches 620 photolithographically defined and chemically etched through the substrate. In such an arrangement, close tolerance (typically 1 $\mu$m or less) is ensured by using a common mask to define both the holes and the V-shaped notches in substrate 202. Materials which can be used for planar substrate 202 include well known silicon materials or FOTOFORM glass (trademark of Corning Glass) which can be etched. The silicon or FOTOFORM material is photo-patternable via exposure to UV light and subsequent chemical etching. A high precision mask is used to form the desired hole pattern and V-shaped grooves in either the silicon or FOTOFORM glass substrate. This process is well known and is not discussed further herein.

Figure 7:
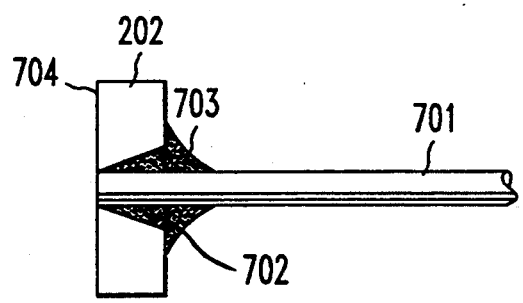
FIG. 7 shows an illustrative cross section of a hole etched in the substrate of FIG. 6 and the mounting of an optical fiber therein.

Shown in FIG. 7 is an illustrative cross section of a hole 702 etched in substrate 202 of FIG. 6 and the mounting of an optical fiber therein. After the hole pattern is photolithographically defined and chemically etched, the cross section of the hole appears as is shown in 702. The optical fiber 701 is inserted in hole 702 so that it extends beyond surface 704 of substrate 202. The optical fiber 701 is then permanently mounted in hole 702 using epoxy, as is shown by 703. The length of optical fiber 701 may be shortened by either cutting, cleaving or some other technique. Thereafter, the substrate 202 is placed in a polishing jig and the optical fiber end and substrate surface 704 are polished flat. This ensures that good optical coupling will exist between optical fibers mounted in their respective substrates.

Figure 8:
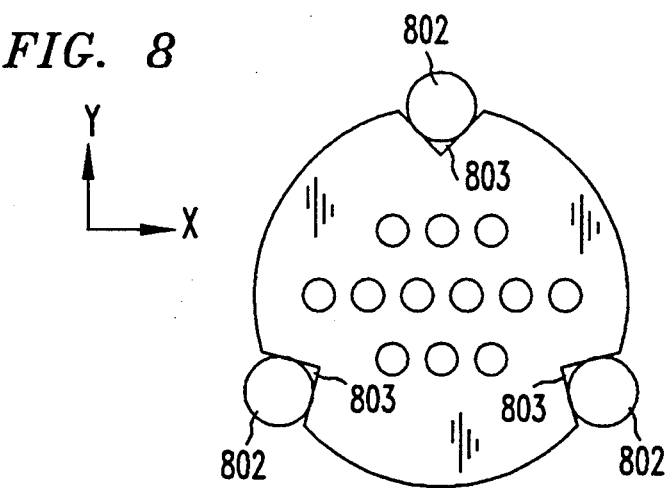
FIG. 8 shows another illustrative connector utilizing a notched substrate and guide pin arrangement.

Shown in FIG. 8 is another illustrative substrate 801 and alignment or guide pin 802 arrangement. The substrate 801 is circularly shaped and includes V-shaped notches, e.g., 803, that are located in opposing relationships to ensure that the substrate is properly aligned in the X and Y direction. Note that the arrangement of optical fiber holes can be other than regularly spaced holes in a substantially straight line (e.g., a linear array). However, since multiple optical fiber cable is typically a ribbon-shaped cable, a linear array of holes is probably the preferred arrangement. Additionally, the substrate 801 may include a two-dimension arrangement of holes to, illustratively, accommodate multiple fiber ribbons.

Figure 9:
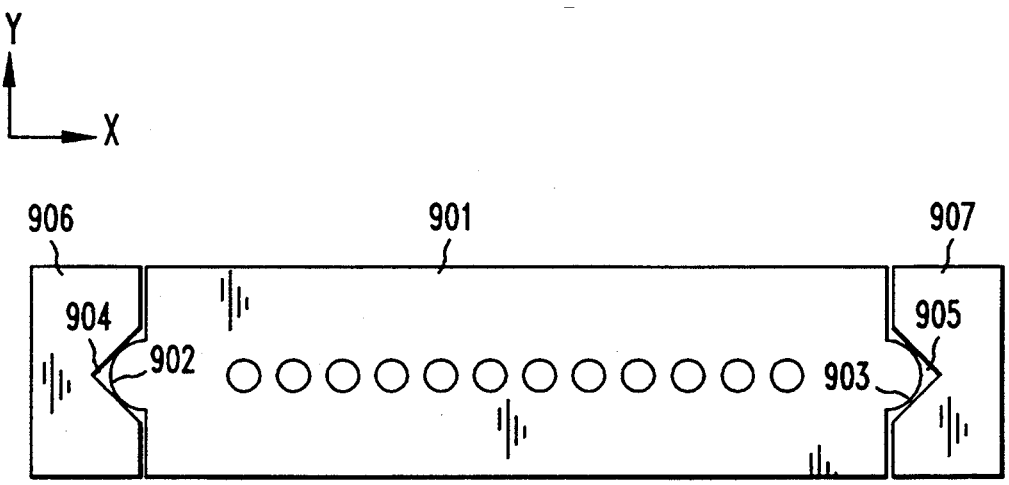
FIG. 9 shows an illustrative connector utilizing a substrate with a formed projection and a notched post guide arrangement.

FIG. 9 shows a substrate having formed projections which align with notched guide pins or posts. The substrate 901 includes circular projections 902 and 903 which contact V-shaped grooves 904 and 905, respectively, in guide posts 906 and 907, respectively.

It should be understood that, for any connector, the number and shapes of the substrate alignment regions (e.g., V-shaped notches or projections) and the mating guide post (e.g., alignment pin or notched guide post) should be such as to align fibers mounted in the substrate with corresponding fibers mounted in a substrate of another connector, when that connector is mated to this connector. Additionally, it should be recognized that while generally one connector will be a male connector (i.e., the one with alignment pins) and one will be a female connector, it is contemplated that unisex connectors can be constructed. A unisex connector would, illustratively, have one alignment pin and one alignment recess or opening which would mate with another unisex connector.

Additionally, an interleaved arrangement of latching components 302 and 404 may be formed on each edge of the unisex connector to enable the proper engagement to interleaved components of an inverted unisex connector.

Furthermore, if desired, more than one type of alignment region and mating guide post can be incorporated in a connector.

According to another aspect of the invention, the size of the alignment posts may be different to ensure that the mating connectors interconnect in only one orientation.

Thus, what has been described is merely illustrative of the application of the principles of the present invention. Other arrangements and methods can be implemented by those skilled in the art without departing from the spirit and scope of the present invention.

We claim:

1. A multiple optical fiber cable connector comprising
   a unitary planar substrate including two surfaces having 1) multiple tapered fiber holes which taper from a first surface to a second surface of said substrate and 2) a plurality of alignment regions located in opposing relationship to each other along the edges of said substrate, said multiple fiber holes and said alignment regions being photolithographically formed substantially perpendicular to and extending between the surfaces, and a multiple optical fiber having each fiber permanently mounted through one of said multiple fiber holes in the first surface of said substrate so that the end of each fiber is substantially flush with the second surface of said substrate.

2. The connector of claim 1 arranged as a male connector including at least two alignment posts mounted substantially perpendicular to the surfaces of said substrate and extending beyond said substrate, each post positioned against an alignment region of said substrate, said at least two posts alignably engaging with two alignment openings in a mating female connector when said female connector is brought into aligned contact with said male connector.

3. The connector of claim 1 wherein said multiple fiber holes are regularly spaced holes in a substantially straight line.

4. The connector of claim 1 wherein said multiple fiber holes are arranged in a two-dimensional arrangement.

5. The male connector of claim 2 including means for enabling a snap connection to a mating female connector.

6. The male connector of claim 2 wherein said substrate is rigidly mounted in a housing of said male connector and wherein each of said at least two posts are mounted between an alignment region of said substrate and a leaf spring mounted in the housing of said male connector.

7. The connector of claim 1 arranged as a female connector including at least two alignment openings, each opening positioned adjacent to an alignment region of said substrate, said at least two openings alignably engaging with two alignment posts mounted in a mating male connector when said male connector is brought into aligned contact with said female connector.

8. The female connector of claim 7 including means for enabling a latching connection to a mating male connector.

9. The female connector of claim 7 wherein said substrate is flexibly mounted in a housing of said female connector so as to permit alignment with the two alignment posts mounted in the mating male connector.

10. The connector of claim 1 further comprising a post mounted substantially perpendicular to the surfaces of said substrate and extending beyond said substrate and positioned against an alignment region of said substrate and including an opening adjacent to at least one other alignment region of said substrate, said post and opening aligned respectively with an opening and post of a matching connector when said matching connector is brought into aligned contact with said connector.

11. The connector of claim 10 including means for enabling a latching connection to a matching connector.

12. The connector of claim 1 wherein at least one of said alignment regions is a notch.

13. The connector of claim 12 wherein said at least one notch is V-shaped.

14. The connector of claim 12 wherein said at least one notch is square-shaped.

15. The connector of claim 1 wherein at least one of said alignment regions is a projection.

16. The connector of claim 15 wherein said at least one projection is substantially a circularly shaped section.

17. The connector of claim 1 wherein the shape of each post and the shape of each alignment region are such that a post makes two points of contact with an alignment region that it is positioned against.

18. A method of constructing a multiple optical fiber connector comprising the steps of etching a unitary planar substrate, having two surfaces, perpendicular to said surfaces to form between said surfaces 1) multiple tapered fiber holes which taper from a first surface to a second surface of said substrate and 2) a plurality of alignment regions located in opposing relationship to each other along edges of said substrate, and inserting and permanently mounting each fiber of a multiple optical fiber through the larger opening of one of said multiple tapered fiber holes in the first surface of said substrate so that the end of each fiber is substantially flush with the second surface of said substrate.

* * * * *